US 6,609,246 B1

(12) United States Patent
Guhr et al.

(10) Patent No.: US 6,609,246 B1
(45) Date of Patent: Aug. 19, 2003

(54) INTEGRATED DEVELOPMENT ENVIRONMENT FOR HIGH SPEED TRANSACTION PROCESSING WWW APPLICATIONS ON HETEROGENEOUS COMPUTER SYSTEMS

(75) Inventors: Jerry T. Guhr, Phoenix, AZ (US); Joseph Picone, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/455,632

(22) Filed: Dec. 7, 1999

(51) Int. Cl.[7] ................................................. G06F 9/44
(52) U.S. Cl. ....................... 717/103; 717/168; 709/200; 709/201; 709/203; 709/205
(58) Field of Search ................................. 709/200, 201, 709/204, 205, 208, 212, 213, 217, 238; 717/103, 114, 167, 149, 148, 140, 124, 176; 705/39, 40

(56) References Cited

U.S. PATENT DOCUMENTS

| 4,742,467 | A | * | 5/1988 | Messerich et al. | .......... 717/114 |
|---|---|---|---|---|---|
| 5,313,635 | A | * | 5/1994 | Ishizuka et al. | ............ 717/173 |
| 5,708,811 | A | * | 1/1998 | Arendt et al. | ............... 717/163 |
| 5,819,071 | A | * | 10/1998 | Mazer | ........................ 703/27 |
| 5,850,554 | A | * | 12/1998 | Carver | ....................... 717/162 |
| 5,881,289 | A | * | 3/1999 | Duggan et al. | ............. 717/145 |
| 5,918,011 | A | * | 6/1999 | Watanabe et al. | ........... 709/205 |
| 5,953,514 | A | * | 9/1999 | Gochee | ....................... 717/138 |
| 5,960,201 | A | * | 9/1999 | Ma et al. | ..................... 717/154 |
| 5,961,586 | A | * | 10/1999 | Pedersen | ..................... 709/201 |
| 5,996,010 | A | * | 11/1999 | Leong et al. | ............... 709/223 |
| 5,999,734 | A | * | 12/1999 | Willis et al. | ................. 717/149 |
| 6,104,875 | A | * | 8/2000 | Gallagher et al. | .......... 717/168 |

OTHER PUBLICATIONS

P. Wilke et al, Integration of genetic algorithms and fuzzy logic into a neural network simulation environment, IEEE, pp. 330–333.*

* cited by examiner

Primary Examiner—Krisna Lim
Assistant Examiner—Adekunle Adegorusi
(74) Attorney, Agent, or Firm—J. S. Solakian; B. E. Hayden; J. H. Phillips

(57) ABSTRACT

An integrated development environment on a client provides for developing transaction programs, web pages, and applets for execution on a high performance transactional based World Wide Web server. The transaction programs are developed on the client, then automatically transferred to the server, where they are automatically compiled, linked, loaded into a TP library, registered with a TP monitor for execution, and tested. Similarly, the web pages and applets are developed on the client, then automatically transferred to the server, loaded into a database, and tested.

16 Claims, 5 Drawing Sheets

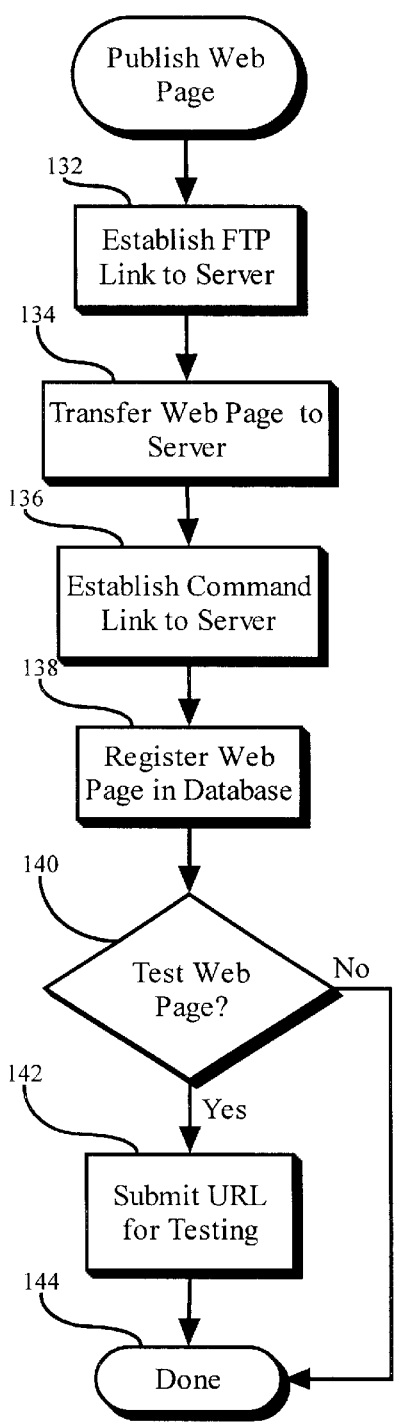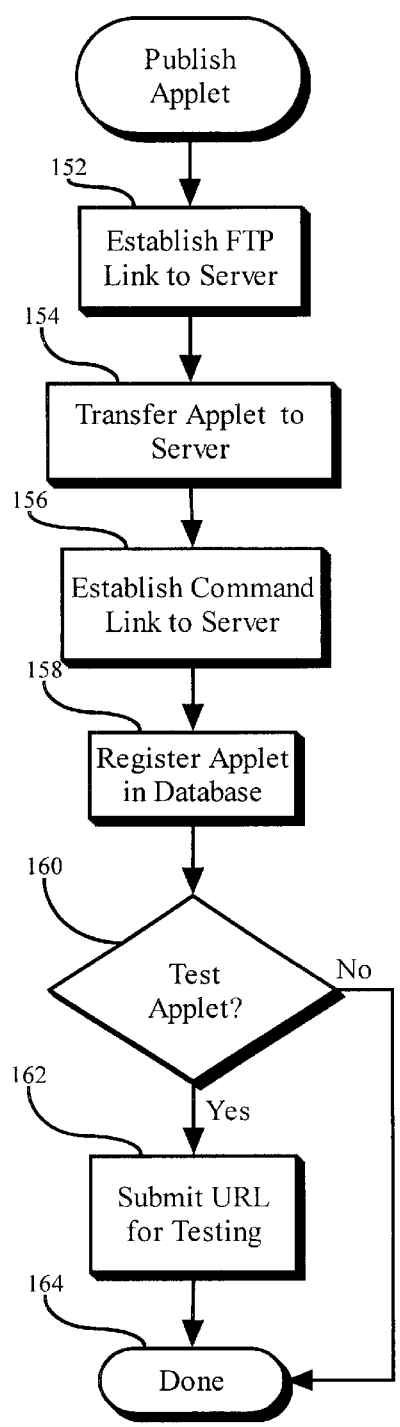

INTEGRATED DEVELOPMENT ENVIRONMENT FOR HIGH SPEED TRANSACTION PROCESSING WWW APPLICATIONS ON HETEROGENEOUS COMPUTER SYSTEMS

FIELD OF THE INVENTION

The present invention generally relates to data processing systems, and more specifically to software development systems for developing World Wide Web (WWW) applications.

BACKGROUND OF THE INVENTION

Software development traditionally required that the developer first edit his source code. He would then compile the code into an object module, and link-edit one or more object modules into an executable. The executable would then be placed into a library for execution. In the case of transaction processing, this would require either that the transaction processing routine (TPR) library be deallocated by the Transaction Processing (TP) monitor long enough to move the executable into the TPR library, or to force the TP monitor to reload its own high speed copy of the TPR library from the common TPR library. The program would then be tested. The process would then repeat until the software development was complete.

This process was simplified for a great extent for instances where the development and ultimate execution were on the same computer system by the introduction of Integrated Development Environments (IDEs). These are typically special purpose text editors executing on personal computers or workstations that provide compiling, linking, loading, and testing in one program. These single system IDEs have become extremely sophisticated. They have been extended to provide development environments for World Wide Web page development and Java Applet development.

One problem with current IDE technology is that these IDE systems operate on a single computer system. At best, they can be used to develop and test program code, WWW pages, and applets for one computer system, then the program executables, WWW pages, and applets can be transferred to a homogeneous computer system for ultimate production. This is the standard mode of Web development in operation today.

Another problem is that using the same type of computer systems for both Web development and Web server execution has serious limitations today. The Integrated Development Environments (IDEs) today operate on Microsoft Windows or Apple MacIntosh based personal computes or Unix based workstations. Extremely user friendly systems have been developed. Unfortunately, these types of system do not lend themselves well to high performance transactional processing. Legacy mainframe computers with high performance transaction processing (TP) monitors are still the best systems for servers that are capable of providing high speed simultaneous access to large shared databases to hundreds, if not thousands, of client systems. Unfortunately, developing and testing programs, web pages, and applets that are to run on these large transaction systems is much more complex than it is on the workstations or personal computers that support typical Integrated Development Environments.

For example, Job Control Language (JCL) is typically required to compile and link-edit transaction processing routines (TPR) on these high performance TP systems. The TPR executables then have to be made available to the TP monitor for high speed access. Similarly, Web pages and Java Applets need to be established so that they can be accessed very quickly, such as being loaded as records into a database. None of these features is provided by the typical state-of-the-art IDE running on a personal computer or workstation.

A method or system that provides the user friendly benefits found in personal computer or workstation based Integrated Development Environments (IDEs) for developing Web based transactional processing routines (TPRs), Web pages, and applets for execution and testing on high performance transactional systems would thus be advantageous.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 4 is a flowchart illustrating operation of the Publish Web Page process, in accordance with a preferred embodiment of the present invention;

FIG. 5 is a flowchart illustrating operation of the Publish Applet process, in accordance with a preferred embodiment of the present invention.

DETAILED DESCRIPTION

An Integrated Development Environment (IDE) on a client provides for developing transaction programs, web pages, and applets for execution on a high performance transactional based World Wide Web server. The transaction programs are developed on the client, then automatically transferred to the server, where they are automatically compiled, linked, loaded into a TP library, registered with a TP monitor for execution, and tested. Similarly, the web pages and applets are developed on the client, then automatically transferred to the server, loaded into a database, and tested.

In the preferred embodiment, the Integrated Development Environment (IDE) includes a Transaction Processing Routine (TPR) Wizard that provides for easy TPR application development. The IDE executes as a Microsoft Windows application program. After source code has been developed on the client system utilizing the IDE, at the touch of a software button or with a single menu selection the TPR application source code, Web page, and/or Applet is transferred to a GCOS 8 mainframe server system. Also automatically generated and transferred is the Job Control Language (JCL) required to either compile and link the source code, or load the Web page and/or Applet into a transaction forms database. Executables are loaded into a TPR library. Then, a Universal Resource Locator (URL) is generated to test the transaction programs, Web pages, and/or applets. The URL is transmitted to the GCOS 8 TP monitor (TP8) for execution. Output from the testing is then returned to the client for display by a Web browser.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
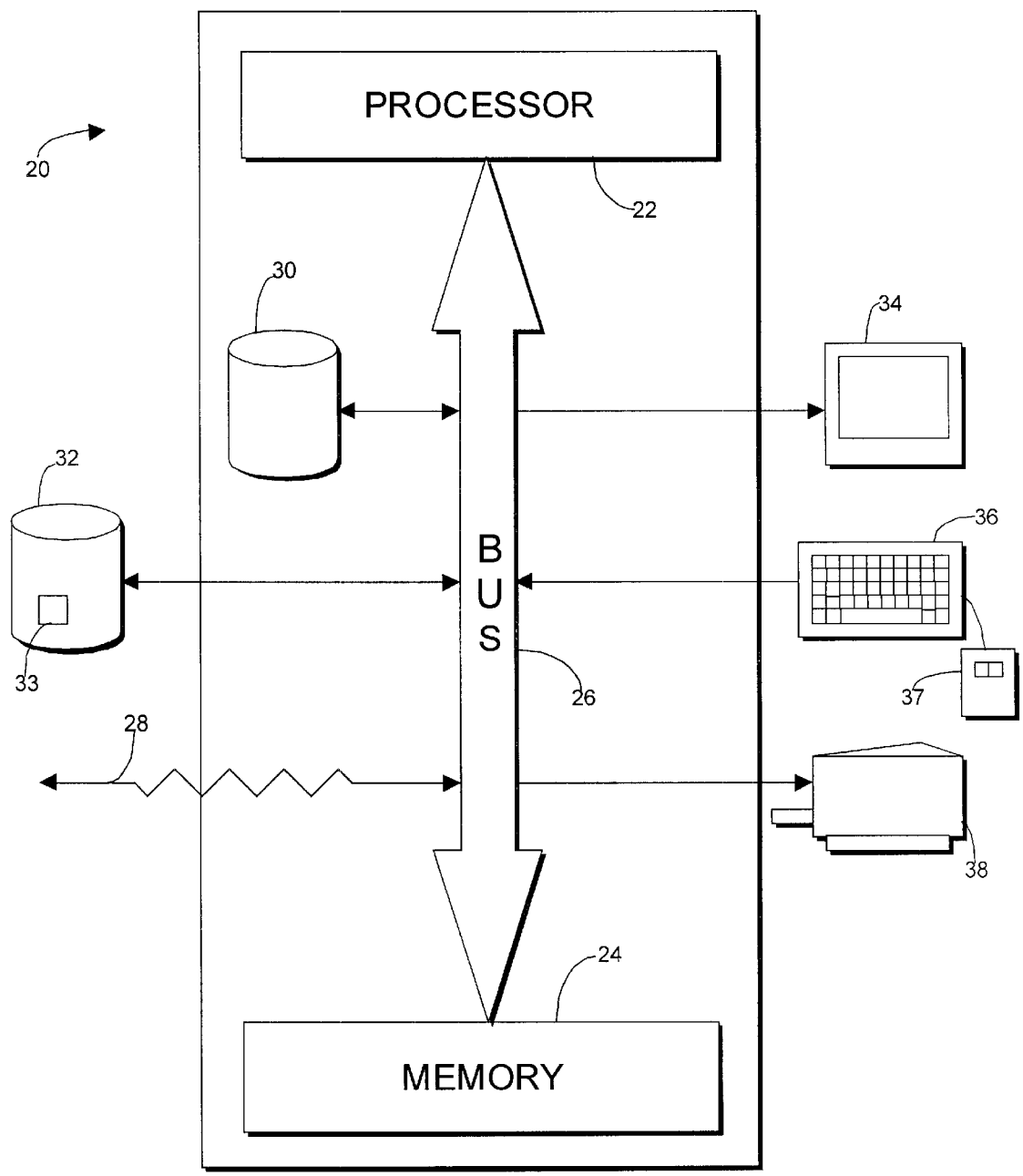
FIG. 1 illustrates a general purpose computer system in accordance with the present invention.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard (with mouse) 36, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such transaction processing programs, operating systems, and other user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
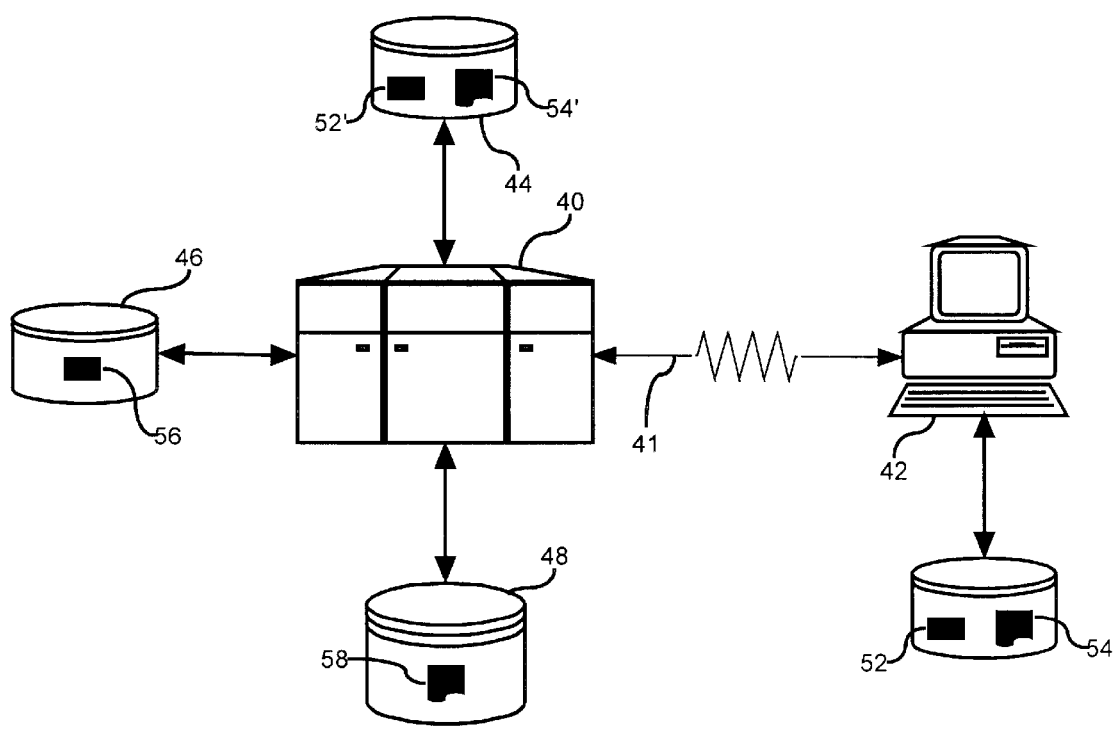
FIG. 2 illustrates a data processing system comprising a server system and a client system for WWW application development.

FIG. 2 is a block diagram illustrating a data processing system comprising a server computer system 40 and a client computer system 42. World Wide Web (WWW) transaction processing routine (TPR) application programs, World Wide Web pages, and Java Applets are developed on the client computer system 42 typically utilizing standard tools such as text editors. The WWW TPR source code 52, and Web page and Java Applet documents 54 are then transferred over a communications link 41 to the server system 40 and stored on disk 44 or other Computer Software Storage Medium. In the preferred embodiment, FTP protocol executing over TCP/IP protocol is utilized for ASCII or text data and HTTP protocol over TCP/IP protocol is utilized for binary data such as graphics, with the client acting as a Web server. A command or interactive connection is then made from the client computer system 42 over the communications link 41 to the server computer 40. In the case of a WWW transactional processing program (TPR), the TPR source code 52' is compiled and linked into TPR executable modules 56 and stored in transactional libraries located on a TP library disk volume 44. The TPR program 56 is then registered, if necessary, with the transaction processing (TP) monitor. WWW Web pages 54', Java Applets, and graphical images are loaded as records 58 into a Web page database 46. A standard WWW web browser such as Netscape Navigator or Microsoft Internet Explorer can then be invoked on the client 42 with an appropriate Universal Reference Locator (URL) to access and test the newly loaded WWW transaction processing Routine (TPR) 56, World Wide Web (WWW) page 58, Java Applet, and/or graphical images on the server system 40.

Figure 3:
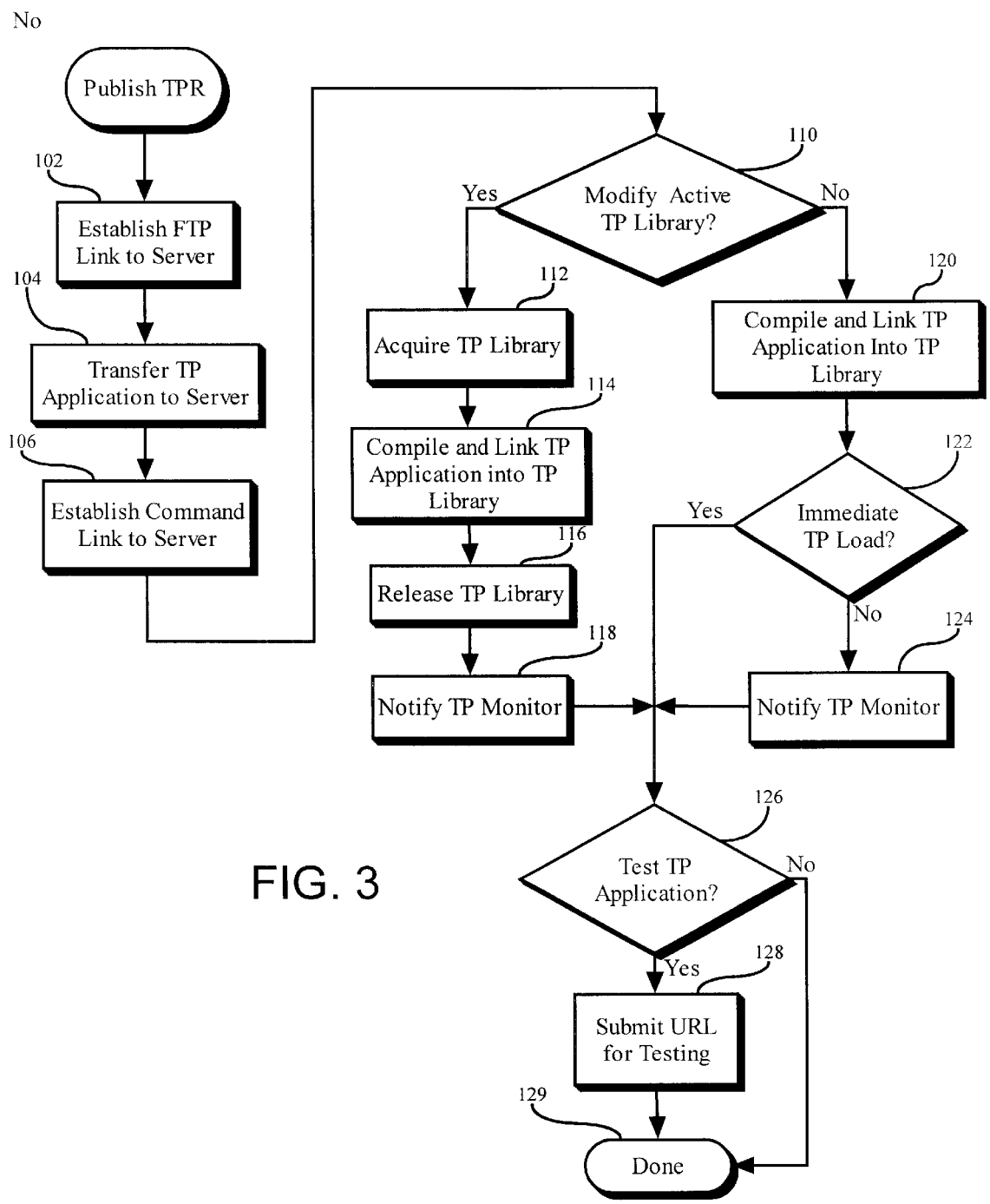
FIG. 3 is a flowchart illustrating operation of the Publish TP Application process, in accordance with a preferred embodiment of the present invention.

FIG. 3 is a flowchart illustrating operation of the Publish TPR Application process. In the preferred embodiment, this is a function of an Integrated Development Environment (IDE) program that provides integrated word processing and browser capabilities. The word processing capabilities are similar to those provided by Microsoft WordPad. However, in alternate embodiments, this functionality can be implemented as a "plug-in" to a text editor such as Microsoft Word or Corel WordPerfect with an interface to a standard Web browser such as Netscape Navigator or Microsoft Internet Explorer. A TPR Wizard within the IDE also provides functionality to allow a developer to select the type of TPR he wants to build and then automatically generates the required source code. The same Publish TPR functionality is provided to publish user written TPRs.

The Publish TPR Routine process is invoked in the (IDE) by selecting a "Publish" menu item or pressing a "Publish" "button". First, a file transfer link is setup between the client system 42 executing the publication software, and the server system 40 on which the transactional program (TPR) software being developed will ultimately execute, step 102. In the preferred embodiment, this is a File Transfer Protocol (FTP) session over TCP/IP protocol over the communications link 41 between the client system 42 and the server system 40. The TP application program (TPR) source code 52 is then transferred to the server computer 40 utilizing this protocol, step 104. Similarly, the Job Control Language (JCL) required to compile and link the TPR is transferred to the server 40. An interactive command link is then setup across the communications link 41 between the client system 42 and the server system 40, step 106. In the preferred embodiment, this is a GTEA ActiveX control session to GCOS. In an alternative embodiment, such as for an IBM S/390 server, this may be a Telnet 3270 session to TSO, or in other embodiments a Telnet session to other operating systems. Commands to compile and link edit the TP program (TPR) 52' are transferred over to the server computer system 40 and submitted for execution. In the preferred embodiment, this includes commands to execute the JCL previously transmitted utilizing FTP. Results of the compilation are then returned to the TP registration program and logged on the client computer system 42.

A test is made whether to modify a currently active TPR module library, step 110. This selection is typically maintained as an application "preference". If it is determined to modify a currently active TPR module library, step 110, the appropriate TPR library is acquired, step 112. In the preferred embodiment, this involves deallocating the TPR library from the TP monitor and allocating it to a job dedicated to the compilation. The TP application program is then compiled and link edited into an executable module and this executable module 56 is added to the TPR library, step 114. The TPR library is then released by the registration job and reallocated to the TP monitor, step 116. The TP monitor is then notified, if necessary, of the new TP application program, step 118.

Alternatively, if it is determined not to modify a currently active TP module library, step 110, the TPR application program 56 is compiled and link edited into a TPR library, step 120. A test is then made whether an immediate TP library load is required, step 122. If an immediate TPR library load is required, step 122, the TP monitor is notified on the server computer system 40, step 124. In response to this notification, the TP monitor reloads its temporary copy of one or more TP module libraries from their permanent counterparts.

In all cases, a test is then made whether or not to test the TPR program 56, step 126. This selection is typically either an application preference, or through use of a selection box presented to the developer after successful compilation and link-editing. If the decision is made to test the TPR application 56, step 126, an appropriate URL is submitted to a Web browser executing on the client system 42, step 128. The Web browser in turn transmits the URL to the server computer system 40. The TP monitor on the server system 40 is then invoked to execute the designated TPR application program 56. Results of that execution are then transmitted back over the communications link 41 to the web browser executing on the client computer system 42. In all cases, the WWW Application Registration process is then complete, step 129.

FIG. 4 is a flowchart illustrating operation of the Publish Web Page process. In the preferred embodiment, this is a function of the IDE program that provides integrated word processing and browser capabilities. However, in alternate embodiments, this functionality can be implemented as a "plug-in" to a text editor such as Microsoft Word or Corel WordPerfect. First, a file transfer link is setup between the client system 42 executing the registration software, and the server system 40 on which the Web page being developed will ultimately be stored, step 132. In the preferred embodiment, this is a File Transfer Protocol (FTP) session over TCP/IP protocol over the communications link 41 between the client system 42 and the server system 40. The Web page 54 is then transferred to the server computer 40 utilizing this protocol, step 134. Any required Job Control Language (JCL) is also transferred to the server system 42 (none is required in the preferred embodiment). An interactive or command link is then setup between the client system 42 and the server system 40, step 136. In the preferred embodiment, this is a GTEA ActiveX control session to GCOS. In an alternative embodiment, such as for an IBM S/390 server, this may be a Telnet 3270 session to TSO. Commands to register the Web page are transferred over to the server computer system 40 and submitted for execution, step 138. In the preferred embodiment, this involves execution of a database program that loads the Web page as a record 58 into the Web database 48.

A test is made whether to test the Web page 58, step 140. This is typically implemented either as a "preference" or as an option that can be "checked" or enabled. If it is determined to test the Web page 58, step 140, the appropriate Universal Resource Locator (URL) is submitted to the Web browser on the client 42, step 142. The URL is transmitted over the communications link 41 to the server 40. The server responds by retrieving the Web page 58 from the Web database 48 and transmitting it back to the Web browser on the server system 42, where it is then displayed. In all cases, the WWW Web Page Registration process is then complete, step 144.

FIG. 5 is a flowchart illustrating operation of the Publish Applet process. In the preferred embodiment, this involves registration of Java Applets and graphical images. However, in other embodiments, other downloadable programs may be published. In the preferred embodiment, this Publish Applet process is a function of the IDE program that provides integrated word processing and browser capabilities. However, in alternate embodiments, this functionality can be implemented as a "plug-in" to a text editor such as Microsoft Word. First, a file transfer link is setup between the client system 42 executing the registration software, and the server system 40 on which the applet being developed will ultimately be stored, step 152. In the preferred embodiment, this is a File Transfer Protocol (FTP) session over TCP/IP protocol over the communications link 41 for text such as ASCII between the client system 42 and the server system 40. In the case of binary data, such as graphical images, the IDE on the client system 42 acts as a Web server and opens a TCP/IP socket and sends the server system 40 acting as a workstation a publish command with the client IP and socket address. The server system 40 responds with a "GET" request, and the IDE transmits the binary file 54 to be published to the server 40. The applet or graphical image 54 is then transferred to the server computer 40 utilizing the appropriate protocol, step 154. Any required Job Control Language (JCL) is also transferred to the server system 42 (none is required in the preferred embodiment). JCL, being ASCII text, is transferred utilizing FTP. An interactive or command link is then setup between the client system 42 and the server system 40, step 156. In the preferred embodiment, this is a GTEA ActiveX command session to GCOS. In an alternative embodiment, such as for an IBM S/390 server, this may be a Telnet 3270 session to TSO. Commands to publish or register the applet or graphical image are transferred over to the server computer system 40 and submitted for execution, step 158. In the preferred embodiment, this involves execution of a database program that loads the applet into the Web database 48.

A test is made whether to test the applet or graphical image 58 stored in the database 48, step 160. This is typically implemented either as a "preference" or as an option that can be "checked" or enabled. If it is determined to test the applet, step 160, the appropriate Universal Resource Locator (URL) is submitted to the Web browser on the client 42, step 162. The URL is transmitted over the communications link 41 to the server 40. The server responds by retrieving the applet from the Web database 48 and transmitting it back to the Web browser on the server system 42, where it is then executed. In all cases, the Applet Registration process is then complete, step 164. While publication of applets and graphical images are disclosed herein, it should be understood that publication of other types of downloadable data, images, sound, and video to a Web server 40 are also within the scope of this invention.

Figure 6:
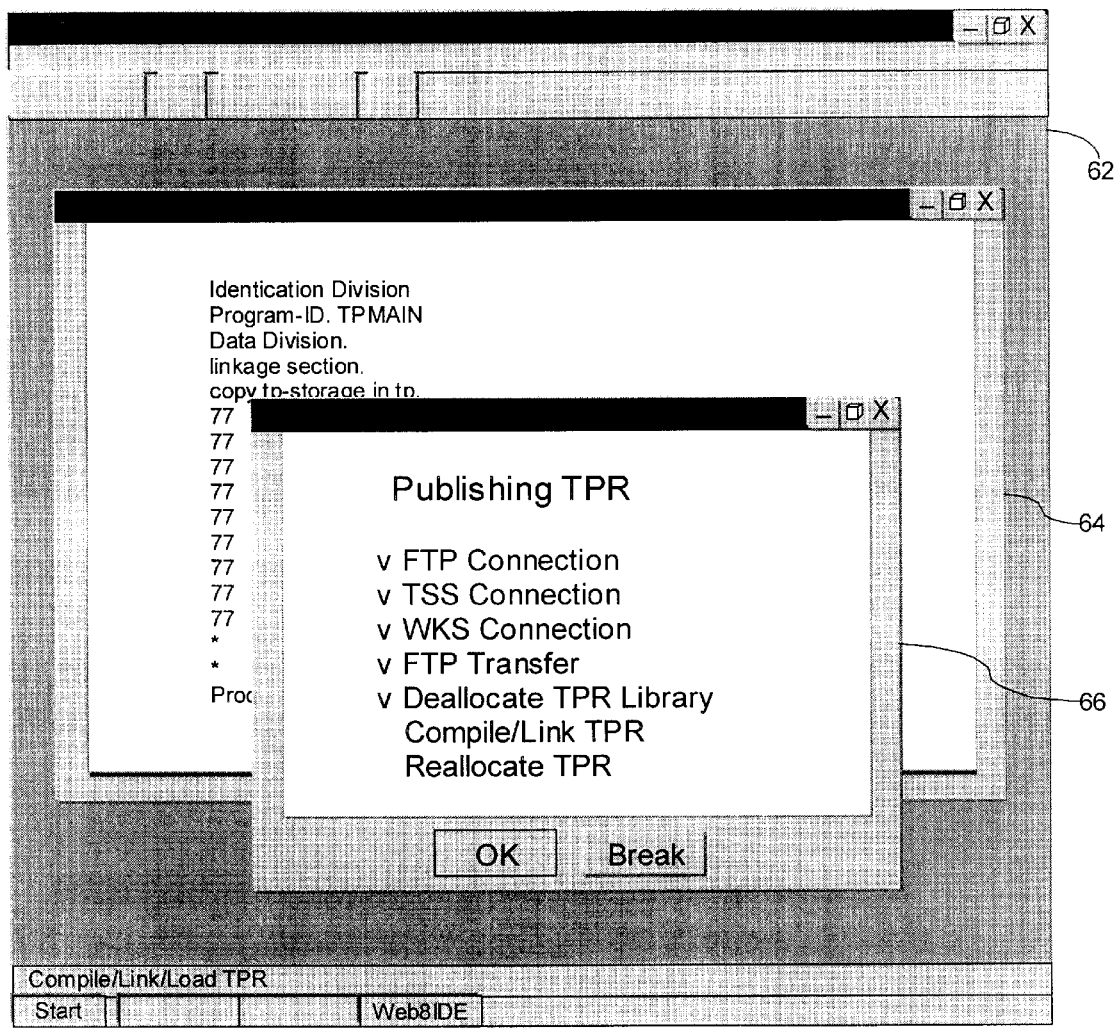
FIG. 6 is a diagram illustrating sample graphical user interface windows from execution of the Publish TP Routine process shown in FIG. 3.

FIG. 6 is a diagram illustrating sample graphical user interface windows from execution of the Publish TP Routine (TPR) process shown in FIG. 3. In the preferred embodiment, the Publish TP Routine (FIG. 3), Publish Web Page (FIG. 4), and Publish Applet (FIG. 5) execute as functions within the IDE. However, they can also execute as plug-ins to either a text editor or Web browser on a client system 42 executing a Microsoft Windows 95/98/NT/2000 operating system. Other alternate environments within the scope of this invention include other graphical user interfaces (GUIs) such as the Apple MacIntosh, and X-Windows in a Unix or Linux environment. FIG. 6 shows execution of the IDE on a Microsoft Windows 95/98/NT/2000 system. A Microsoft Windows desktop 62 is shown with two visible windows 64, 66. A first window 64 shows Cobol source code for the TP routine to be published and tested. In this case, the first window 64 shows the text editor being utilized to develop the TP routine (TPR). In the preferred embodiment, this text editor is a function of the IDE. However in other embodiments, it can be a word processing program such as Microsoft Windows or Corel WordPerfect. A second window 66 overlaying the first window 64 graphically shows the execution of the Publish TP Routine process shown in FIG. 3. Seven steps are shown in the second window 66, with check (√) marks indicating completion of each of the steps. Table T-1 shows the correspondence between the steps shown in this window and the steps in FIG. 3.

TABLE T-1

Correspondence Between Steps in FIG. 6 and Steps in FIG. 3

| Action | Ref # |
|---|---|
| FTP Connection | 102 |
| TSS Connection | 106 |
| WKS Connection | * |
| FTPTransfer | 104 |
| Deallocate TPR Library | 112 |
| Compile/Link TPR | 108, 114 |
| Reallocate TPR | 116 |

*Not Shown in FIG. 3

Two buttons are shown at the bottom of the second window 66. The second button is marked "Break" and it is the default button. If "pressed", the Publish TPR process will be terminated. Alternatively, when the steps in the second window 66 complete successfully (all being marked with a "√"), and the new TP routine is loaded into the TP library, the "OK" button is replaced by a "Test" button, and the "Break" button is replaced by a "Close" button. If the "Test" button is selected and "depressed" (see step 126 in FIG. 3), a URL is submitted to the Web browser on the client system 42. The Web browser transmits the URL to the server system 40, which executes the corresponding TP routine in response to the URL. The response, which is typically a Web page, is transmitted back to the Web browser on the client system 42, where it is displayed to the developer. In any case, regardless of whether or not testing of the TPR was selected, and regardless of whether the "Close" or "Test" button was "depressed", the Publish TP Routine process (FIG. 3) is complete, step 129.

An integrated development environment (IDE) on a client system 42 has been disclosed herein that provides for developing and testing transaction programs, web pages, applets, and graphical images for execution on a high performance transactional based World Wide Web server 40. This IDE provides for file transfer of TP routine source code 52 to the server 40, compiling and link editing of the source code 52' into an executable TPR 56, loading the executable TPR into a TPR library, and testing of the TPR on the server from the client system 42, all with a single menu selection or "click". Similarly one menu selection or "click" provides for transferring web pages and/or Java applets 54 to the server 40, loading the web page and/or applets 54' into a transactional forms database 48 on the server 40, and then testing the display of the web pages and/or execution of the applets 58.

Those skilled in the art will recognize that modifications and variations can be made without departing from the spirit of the invention. Therefore, it is intended that this invention encompass all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

what is claimed is:

1. A method of providing an integrated Development Environment on a first computer system for publishing World Wide Web applications on a second computer system, said method comprising: providing a plurality of program development services in response to a publication command, wherein the plurality of program development services comprises:
   A) establishing a file transfer link from the first computer system to the second computer system;
   B) transferring a first source file from the first computer system to the second computer system utilizing the file transfer link, wherein said first source file includes a set of program language source code statements;
   C) establishing a command link from the first computer system to the second computer system; and
   D) initiating a publication of the first source file on the second computer system through submission of a set of one or more initiation commands transmitted across the command link to the second computer system, said step of initiating a publication comprising the steps of:
      1) compiling the first source file into an object module,
      2) link editing the object module into an executable, and
      3) making the executable available for use by a transaction processing system, including the steps of:
         a) notifying the transaction processing system to release a transaction program library;
         b) storing the executable in the transaction program library; and
         c) notifying the transaction processing system to reacquire the transaction program library.

2. The method in claim 1 wherein the plurality of program development services further comprises:
   E) transmitting a URL from the first computer system to the second computer system, wherein:
      The URL causes an execution of the executable by the transaction processing system on the second system;
   F) receiving a result from the second computer system from the execution of the executable; and
   G) displaying the result received in program development services (F) on the first computer system.

3. The method in claim 1 wherein:
the source file contains a set of source commands for a web page; and
the publication in program development services (D) comprises:
   1) executing a program that loads the set of source commands for the web page as a set of one or more records into a database.

4. The method in claim 3 wherein:
the plurality of program development services further comprises:
   E) transmitting a URL from the first computer system to the second computer system, wherein:
      The URL causes retrieving of the set of source commands for the web page from the database;
   F) receiving the set of source commands for the web page retrieved from the database in response to receiving the URL in program development services (E); and
   G) displaying a web page resulting from receiving the set of source commands in program development services (F) on the first computer system.

5. The method in claim 1 wherein:

the source file contains a set of applet commands for execution in a web browser; and the publication in program development services (D) comprises:

1) executing a program that loads the set of applet commands as a set of one or more records into a database.

6. The method in claim 5 wherein:

the plurality of program development services further comprises:

E) transmitting a URL from the first computer system to the second computer system, wherein:
The URL causes retrieving of the set of applet commands from the database;

F) receiving the set of applet commands retrieved from the database in response to the URL transmitted in program development services (D); and G) displaying a result of executing the applet received in program development services (F) from the first computer system.

7. The method in claim 1 wherein:

the plurality of program development services further comprises:

E) transmitting a second source file over the file transfer link to the second computer system, wherein:
the second source file contains a set of job control language statements; and the publishing in program development services (D) is performed by submitting the set of job control language statements for execution on the second source file.

8. The method in claim 1 which further comprises:

providing text editing for editing the first source file.

9. The method in claim 1 which further comprises:

providing web browsing for displaying the results of publishing the first source file.

10. Integrated Development Environment software for execution on a first computer system for publishing World Wide Web applications on a second computer system, said Integrated Development Environment software comprising:

a set of computer instructions stored in a Computer Software Storage Medium that provide a plurality of program development services in response to a publication command, wherein the plurality of program development services comprises:

A) establishing a file transfer link from the first computer system to the second computer system;

B) transferring a first source file from the first computer system to the second computer system utilizing the file transfer link, wherein the first source file contains a set of program language source code statements;

C) establishing a command link from the first computer system to the second computer system; and D) initiating a publication of the first source file on the second computer system through submission of a set of one or more initiation commands transmitted across the command link to the second computer system, said step of initiating a publication comprising the steps of:

1) compiling the first source file into an object module, 2) link editing the object module into an executable, and 3) making the executable available for use by a transaction processing system, including the steps of:

a) notifying the transaction processing system to release a transaction program library;

b) storing the executable in the transaction program library; and c) notifying the transaction processing system to reacquire the transaction program library.

11. The Integrated Development Environment software in claim 10 wherein:

the plurality of program development services further comprises:

E) transmitting a URL from the first computer system to the second computer system, wherein:
The URL causes an execution of the executable by the transaction processing system on the second system;

F) receiving a result from the second computer system from the execution of the executable; and G) displaying the result received in program development services (F) on the first computer system.

12. The Integrated Development Environment software in claim 10 wherein:

the source file contains a set of source commands for a web page; and the publication in program development service (D) comprises:

1) executing a program that loads the set of source commands for the web page as a set of one or more records into a database.

13. The Integrated Development Environment software in claim 12 wherein:

the plurality of program development services further comprises:

E) transmitting a URL from the first computer system to the second computer system, wherein:
The URL causes retrieving of the set of source commands for the web page from the database;

F) receiving the set of source commands for the web page retrieved from the database in response to receiving the URL in program development services (E); and G) displaying a web page resulting from receiving the set of source commands in program development services (F) on the first computer system.

14. The Integrated Development Environment software in claim 10 wherein:

the source file contains a set of applet commands for execution in a web browser; and the publication in program development service (D) comprises:

1) executing a program that loads the set of applet commands as a set of one or more records into a database.

15. The Integrated Development Environment software in claim 14 wherein:

the plurality of program development services further comprises:

E) transmitting a URL from the first computer system to the second computer system, wherein:
The URL causes retrieving of the set of applet commands from the database;

F) receiving the set of applet commands retrieved from the database in response to the URL transmitted in program development services (D); and G) displaying a result of executing the applet received in program development services (F) from the first computer system.

16. A method of providing an integrated Development Environment on a first computer system for publishing World Wide Web applications on a second computer system, said method comprising:

providing a plurality of program development services in response to a publication command, wherein the plurality of program development services comprises:

A) establishing a file transfer link from the first computer system to the second computer system;

B) transferring a first source file from the first computer system to the second computer system utilizing the file transfer link, wherein said first source file includes a set of program language source code statements;

C) establishing a command link from the first computer system to the second computer system; and D) initiating a publication of the first source file on the second computer system through submission of a set of one or more initiation commands transmitted across the command link to the second computer system, said step of initiating a publication comprising the steps of:

1) compiling the first source file into an object module, 2) link editing the object module into an executable, and 3) making the executable available for use by a transaction processing system, including the steps of:

a) storing the executable in a first transaction program library; and b) notifying the transaction processing system to load a second transaction program library from the first transaction program library, wherein:

the transaction processing system loads executable modules for execution from the second transaction library.

* * * * *